(12) United States Patent
Czamara (10) Patent No.: US 9,041,250 B1
(45) Date of Patent: May 26, 2015

(54) SYSTEM AND METHOD FOR MAINTAINING POWER TO ELECTRICAL SYSTEMS

(75) Inventor: Michael P. Czamara, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 557 days.

(21) Appl. No.: 13/420,743

(22) Filed: Mar. 15, 2012

(51) Int. Cl.
*H02J 3/14* (2006.01)
*H02J 9/00* (2006.01)

(52) U.S. Cl.
CPC .................................. *H02J 3/14* (2013.01)

(58) Field of Classification Search
USPC .......................................................... 307/64
See application file for complete search history.

(56) References Cited

U.S. PATENT DOCUMENTS

| | | | |
|---|---|---|---|
| 4,060,735 A | 11/1977 | Pascucci et al. | |
| 5,675,194 A | 10/1997 | Domigan | |
| 6,714,977 B1 | 3/2004 | Fowler et al. | |
| 6,782,833 B2 | 8/2004 | Nightall | |
| 6,992,247 B2 | 1/2006 | Rasmussen et al. | |
| 7,560,831 B2 | 7/2009 | Whitted et al. | |
| 8,321,163 B2 | 11/2012 | Ewing et al. | |
| 2005/0068716 A1 | 3/2005 | Pereira | |
| 2007/0046103 A1 | 3/2007 | Belady et al. | |
| 2008/0093927 A1 | 4/2008 | Ewing et al. | |
| 2009/0234512 A1 | 9/2009 | Ewing et al. | |
| 2009/0314541 A1 | 12/2009 | Jones et al. | |
| 2010/0235671 A9 | 9/2010 | Jain | |
| 2012/0181869 A1* | 7/2012 | Chapel et al. | 307/64 |

OTHER PUBLICATIONS

"Two-Channel Intercom Power Supply PS-232" Clear-Com Intercom Systems 2002, pp. 1-2.
Keith Brandt "When Bad Harmonics Happen to Good People" Downloaded May 13, 2011 from news.ospmag.com OSP Magazine published Nov. 2007 pp. 1-3.
U.S. Appl. No. 13/173,102, filed Jun. 30, 2011, Osvaldo P Morales et al.
U.S. Appl. No. 13/071,488, filed Mar. 24, 2011, Michael P. Czamara et al.
U.S. Appl. No. 13/076,198, filed Jun. 30, 2011, Osvaldo P Morales et al.

\* cited by examiner

*Primary Examiner* — Robert Deberadinis
(74) *Attorney, Agent, or Firm* — Robert C. Kowert; Meyertons, Hood, Kivlin, Kowert & Goetzel, P.C.

(57) ABSTRACT

A back-up feed system includes a feed input, a feed output, and a feed switching device. The feed input is coupled with an electrical power source. The feed output can couple with power lines in a power distribution unit at a location downstream from circuit protection devices the power distribution unit. The feed switching device can supply back-up electrical power from the power source to electrical systems in the event of a fault condition in the power distribution unit.

32 Claims, 7 Drawing Sheets

SYSTEM AND METHOD FOR MAINTAINING POWER TO ELECTRICAL SYSTEMS

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

From time to time, elements in the power chain providing power to electrical systems fail or shut down. For example, if a power distribution unit that provides power to electrical systems is overloaded, an overload protection device in the power distribution unit (for example, a fuse or breaker) may trip, shutting down all of the electrical systems that are receiving power through that line of the power distribution unit.

When a breaker protecting a branch of a power distribution unit has tripped, power may be lost to all the electrical systems that receive power from that branch until the breaker has been reset. Maintenance personnel typically need to physically go the rack to restore service to electrical systems (for example, by addressing the overload condition and manually resetting the breaker). The down-time associated with troubleshooting and correcting rack power distribution unit faults and shut downs may result in a significant loss of computing resources. In some critical systems such as hospital equipment and security systems, down-time may result in significant disruption and, in some cases, adversely affect health and safety.

In many cases, moreover, the condition in the electrical systems that caused a breaker in a PDU to trip is only temporary or transient. For example, a temporary short may have occurred when service personnel unplugged a server from a rack PDU. In such cases, some of the downtime results simply from the PDU breaker being in a tripped state, even though all of the components upstream and downstream from the tripped breaker have since been restored to operational readiness.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for maintaining power to electrical systems, such as computing devices in a data center, are disclosed. According to one embodiment, a power distribution system includes one or more rack power distribution units, a primary power system, and one or more back-up feed systems. The power distribution system supplies electrical power to electrical systems through power lines. The primary power system supplies electrical power to the power lines in rack power distribution units. The back-up feed systems may include a feed input, a feed output, and a feed switching device. The feed input is coupled with an electrical power source. The feed output is coupled with the power lines in the rack power distribution units at a location downstream from circuit protection devices the rack power distribution units. The feed switching device supplies back-up electrical power from the power source to the electrical systems during loss of electrical power from the primary power system.

According to one embodiment, a back-up feed system includes a feed input, a feed output, and a feed switching device. The feed input is coupled with an electrical power source. The feed output can couple with power lines in a power distribution unit at a location downstream from circuit protection devices the power distribution unit. The feed switching device can supply back-up electrical power from the power source to electrical systems in the event of a fault condition in the power distribution unit.

According to one embodiment, a method of maintaining electrical power to electrical systems in operation includes coupling feed lines with one or more power lines in power distribution units. The feed lines are coupled to at least one of the power lines at a location downstream from a circuit protection device the power distribution units, The power distribution unit is included in a primary power distribution system that supplies power to one or more electrical systems. A back-up feed is switched on in response to detection of a fault (for example, power loss) in the primary power distribution system. Back-up power is supplied through the feed lines to the electrical systems.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein, one component in a power distribution system is "upstream" from another component in the power distribution system if the one component supplies power to the other component or is at a higher level in the power distribution system than the other component. For example, a UPS may be upstream from a floor PDU, or a rack PDU may be upstream from a power supply unit for a server.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "cable" includes any cable, conduit, or line that carries one or more conductors and that is flexible over at least a portion of its length. A cable may include a connector portion, such as a plug, at one or more of its ends.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "floor power distribution unit" refers to a power distribution unit that can distribute electrical power to various components in a computer room. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain. As used herein, a "tertiary feed" refers to any feed that supplies power that is separate from two power systems (such as a primary power system and a reserve power system) for at least a portion of the two power system chains. In some embodiments, a secondary power feed or tertiary feed may be completely independent of the primary power distribution system. In some embodiments, however, a secondary feed or tertiary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, "source power" includes power from any source, including but not limited to power received from a utility feed. In certain embodiments, "source power" may be received from the output of a transformer.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

In various embodiments, a back-up power feed is established to electrical systems at a point downstream from one or more circuit protection devices in a power distribution system. In some embodiments, a back-up feed system feeds back-up power to a power distribution unit at a point downstream from circuit protection devices in the power distribution unit.

Systems receiving power from a back-up feed may be of various types. Examples include hospital equipment, utility systems, security systems, military systems, telecommunications systems, or electronic commerce systems. In certain embodiments, an additional feed is provided to a critical system, such as a life support system. In some embodiments, the systems are computer systems in a data center. In some embodiments, the feed is accomplished by paralleling a primary power distribution system over a portion of a power distribution chain.

Figure 1:
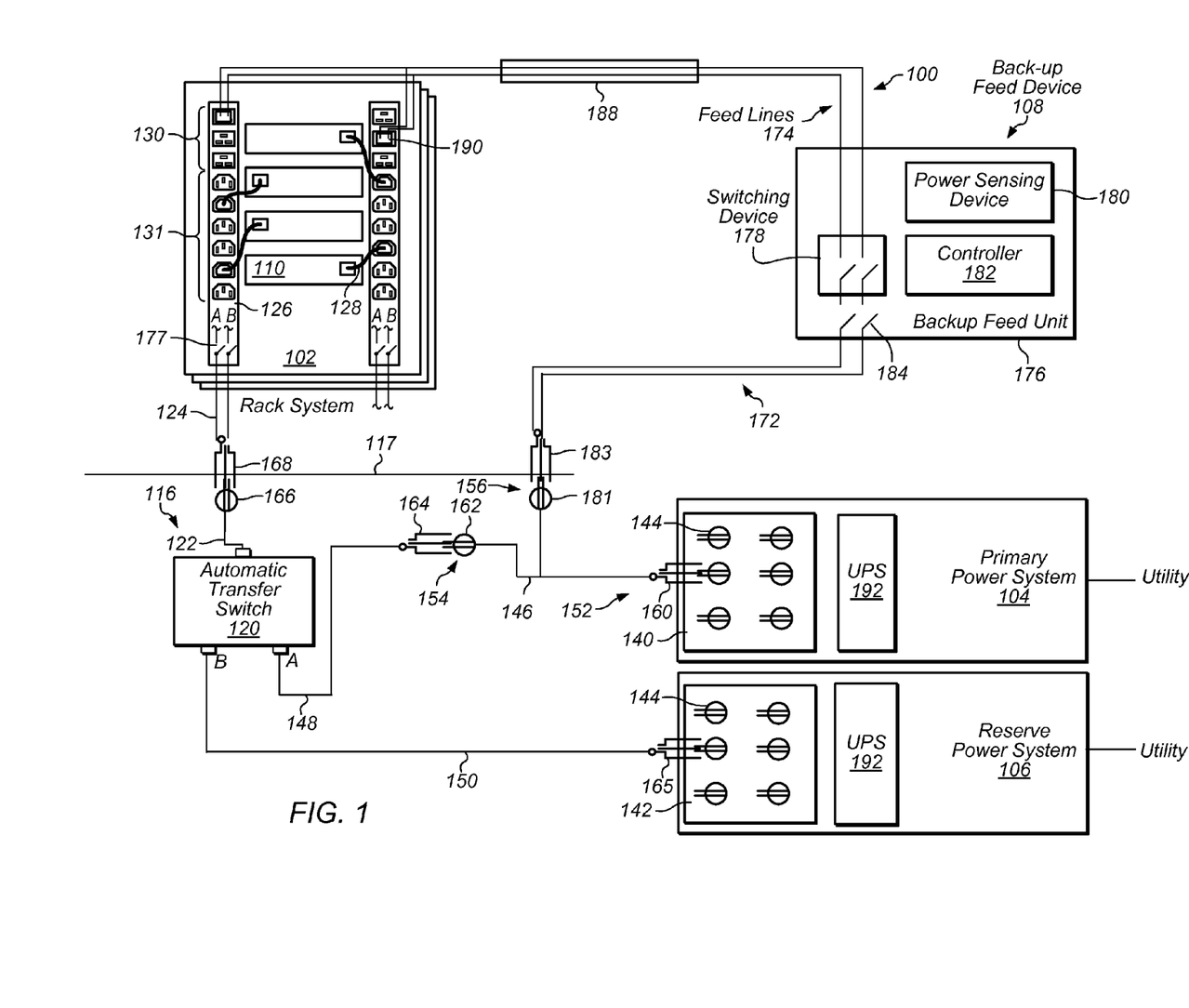
FIG. 1 is a block diagram illustrating one embodiment of a data center including a feed device that can provide power to electrical systems through a rack power distribution unit.

In some embodiments, a data center includes a back-up feed device that can feed electrical power to electrical systems through a rack power distribution unit. In one embodiment, the back-up feed device taps electrical power from a power source panel and feeds it to a rack power distribution unit. FIG. 1 is a block diagram illustrating one embodiment of a data center including a back-up feed device that can provide power to electrical systems through a rack power distribution unit.

Data center 100 includes rack systems 102, primary power system 104, reserve power system 106, and feed device 108. Rack systems 102 include electrical systems 110. Electrical systems may include, for example, computer systems, rack-mounted servers, network control devices, power supply units, air moving devices, and mass storage devices.

Rack systems 102 are located in computing room 112. Electrical systems 110 may receive electrical power from primary power system 104 and reserve power system 106 by way of subfloor feed 116 to computing room 112. Each of primary power system 104 and reserve power system 106 is coupled to automatic transfer switch 120. Rack power distribution unit 126 in rack system 102 may be coupled to automatic transfer switch 120 by way of subfloor cable 122 and rack supply cable 124 at floor 117. Rack power supply cable 124 is coupled with rack power distribution unit 126.

Rack power distribution unit 126 includes rack PDU receptacles 130. In one embodiment, rack PDU receptacles 130 are IEC 60320 C19 receptacles and rack PDU receptacles 131 are IEC 60320 C13 receptacles. In some embodiments, all of rack PDU receptacles 130 and 131 are wired in parallel with one another. In other embodiments, sets of rack PDU receptacles 130 and 131 may be split into two or more banks of receptacles. The receptacles in each bank may be wired in parallel with one another. In some embodiments, one bank of receptacles is provided for each hot wire from the power source (one bank for A-neutral, another for B-neutral) or for each hot wire pairing from the power source (AB, BC, AC).

In operation of data center 100, any or all of rack PDU receptacles 130 may be used to supply power to electrical systems in rack system 102, such as servers. Electrical systems 110 are coupled to rack power distribution unit 126 by way of cables 128. Cables 128 are coupled in various rack PDU receptacles 131.

Each of rack power distribution unit 126 includes circuit protection devices 177. Circuit protection devices 177 may be, for example, circuit breakers or fuses. Circuit protection devices 177 may protect components in electrical systems 110 and power distribution system 104 in the event of a fault condition in system 100, such as an electrical short in a power supply unit in one of electrical systems 110.

Primary power system 104 includes primary source receptacle panel 140. Reserve power system 106 includes reserve source receptacle panel 142. Each of primary source receptacle panel 140 and reserve source receptacle panel 142 includes source power receptacles 144. Automatic transfer switch 120 may be coupled to an appropriate one of receptacles 144 in primary source receptacle panel 140 by way of Y-cable 146 and primary power cable 148. Automatic transfer switch 120 may be coupled to an appropriate one of receptacles 144 in reserve source power panel 142 by way of reserve power cable 150.

Y-cable 146 includes input 152, primary output 154, and feed output 156. Input 152 may be coupled to primary power source panel 140. Primary output 154 may be coupled to primary power cable 148. Feed output 156 may provide a connection for coupling feed device 108.

Input 152 of Y-cable 146 is coupled in one of receptacles 144 on primary source receptacle panel 140. In one embodiment, input connector plug 160 of Y-cable 146 is an L6-30P type plug and panel receptacles 144 on primary source receptacle panel 140 are L6-30R type receptacles.

Primary output 154 of Y-cable 146 is coupled with primary power cable 148. In one embodiment, connector portion 162 at primary output 154 of Y-cable 146 is an L6-30R type and connector portion 164 of primary power cable 148 is a L6-30P type.

Reserve power cable 150 is coupled with reserve source receptacle panel 142. Reserve power cable 150 is coupled in one of receptacles 144 on reserve source receptacle panel 142. In one embodiment, input connector plug 164 of reserve source receptacle panel 142 is an L6-30P type plug and panel receptacles 144 on reserve source receptacle panel 142 are L6-30R type receptacles.

Subfloor power cable 122 is coupled to automatic transfer switch 120 and rack supply cable 124. Rack supply cable 124 may supply power to rack power distribution unit 126. In one embodiment, connector portion 166 of subfloor power cable 122 is an L6-30R type and connector portion 168 of rack supply cable 124 is an L6-30P type.

As reflected in FIG. 1, automatic transfer switch 120 may be installed between primary source receptacle panel 140 and rack power distribution unit 126. The "A" side of the automatic transfer switch may be connected to receptacle 144 in primary source receptacle panel 140 of primary power system 104. The "B" side of the automatic transfer switch may be connected reserve source receptacle panel 142 of reserve power system 106. Automatic transfer switch 120 may feed power to electrical systems 110 in rack system 102 from either primary power system 104 or reserve power system 106.

In some embodiments, reserve power system 106 provides reserve power for all of the electrical systems supplied by primary power system 104. In some embodiments, reserve power system 106 is powered up at all times during operation of data center 100. Reserve power system 106 may be passive until a failure of one or more components of the primary power side, at which time the reserve power system may become active.

In some embodiments, a feed device provides a secondary feed from a source receptacle panel to electrical systems. The secondary feed may be used, for example, to maintain power to electrical systems in a rack system in the event of a fault condition in the primary power feed to electrical systems 110.

Back-up feed device 108 includes feed device input lines 172, feed lines 174, and feed unit 176. Feed unit 176 includes power switching device 178, power sensing device 180, and controller 182. Feed lines 174 may be included in feed cables 188 between rack PDUs 126 and feed unit 176.

Feed lines 174 may be coupled in PDU receptacles 130 at feed cable outputs 190. Back-up feed device 108 may receive power from primary power system 104. Back-up feed device 108 may back-feed power into rack power distribution unit 126 to supply electrical systems 110 in rack systems 102 with back-up power in the event of a fault condition in primary power system 104.

Power switching device 178 and power sensing device 180 are coupled to controller 182. Power switching device 178 may receive power through feed device input lines 172. Controller 182 may control power switching device 178. Power switching device 178 may be operated to switch power to feed lines 174 on and off.

Power sensing device 180 may sense one or more characteristics or conditions of power in systems coupled to feed lines 174, such as rack PDUs 126. Examples of power characteristics and conditions that may be sensed by a power sensing device include power loss, power anomaly, phase, power redundancy, current levels, voltage levels, usage levels, and temperature.

In the embodiment illustrated in FIG. 1, back-up feed device 108 senses power conditions in rack PDU 126 through power lines to the rack PDU, namely feed lines 174. In some embodiments, nevertheless, a feed device may include one or more separate, dedicated conductors for carrying signals from a rack PDU to a sensing circuit of a feed device. In one embodiment, a feed device includes a current transformer (CT). The CT may be installed at the rack PDU to sense power in the rack PDU. The output of the current transformer may be connected to a power sensor module in a feed unit, such as a feed unit 176.

In the system shown in FIG. 1, the feed coming into rack power distribution unit 126 is fed at a location downstream in the power chain from the circuit protection device 177. In certain embodiments, a back-up feed is established to supply power to electrical systems when the primary power is disabled by a circuit protection device that has triggered (for example, a tripped breaker or a blown fuse).

In some embodiments, a back-up feed system switches on a back-up feed to a power distribution unit in response to a fault condition in the primary power system supplying power to the power distribution unit. In some embodiments, a back-up feed system senses power conditions in a power distribution unit. The back-up feed system may switch on a back-up feed to electrical systems in response to the back-up feed sensors detecting a fault condition in the primary power system for the electrical systems.

In one embodiment, a feed unit is used to establish or maintain power to electrical systems coupled to a rack power distribution unit in the event of a blown fuse or tripped breaker in a rack power distribution unit. A PDU breaker may trip, for example, in the event of an electrical short in a power supply unit in a computing device receiving power from a power distribution unit. For example, referring to FIG. 1, feed unit 108 may be used to establish a power feed to electrical systems 110 where circuit protection device 177 on rack power distribution unit 126 has been tripped. In one embodiment, the back-up feed is maintained power until corrective action has been taken to correct the fault condition in the primary power chain. In one embodiment, the back-up feed is maintained power until the circuit protection device has been reset.

In some embodiments, a back-up feed system continues to sense power conditions or characteristics after the power feed is switched on to a power distribution unit. In certain embodiments, the back-up feed system switches off the back-up feed if the system detects or receives a notification that primary power has been restored to the electrical systems that are being backfed.

Overload protection devices 184 may be included in feed device input lines 172 of feed device 108. Overload protection devices 184 may protect feed device 108 or other component from damage from fault conditions in the power source or systems being backfed by feed device 108. For example, in a short in one of electrical systems 110 persists or recurs after the back-up feed from back-up feed device 108 has been switched on, overload protection device 184 may trip. Overload protection devices 184 may include any suitable device for protecting systems receiving power from feed device 108, such as electrical systems 110 in rack system 102.

In some embodiments, controller 182 may decline to establish a back-up feed to a PDU, or switch a back-up feed off to a PDU, in response to characteristics or conditions in the system. For example, controller 182 may not switch on a back feed for rack PDU if a power supply unit in one of electrical systems 110 continues to be shorted out.

In some embodiments, a feed unit supplies secondary power by backfeeding one or more receptacles in a rack power distribution unit. In FIG. 1, for example, feed unit input 172 is coupled with feed output 156 of Y-cable 146. Feed cables 188 are each coupled in one of rack PDU receptacles 130 of rack power distribution unit 126. Feed device 108 may backfeed power to all of electrical systems 110 that are connected in parallel with the rack PDU receptacles 130 in which feed cable outputs 190 are connected.

In some embodiments, feed cable outputs 190 each couple in one of output receptacles 130 with a C19 connector. In other embodiments, feed cable outputs 190 each couple in one of output receptacles 131 with a C13 connector.

Although in the embodiment shown in FIG. 1, power is backfed to one receptacle in each rack PDU, power may in various embodiments be fed to any number of receptacles in a rack PDU. The number of backfed receptacles may depend on amount of current required by the electrical loads connected to the rack PDU. In certain embodiments, different feed cables of a feed device may have different phase combinations (hot A-neutral, hot B-neutral, AB, BC, etc.), each of which may supply power to a bank of receptacles on a rack PDU that has matching phase characteristics.

Figure 2:
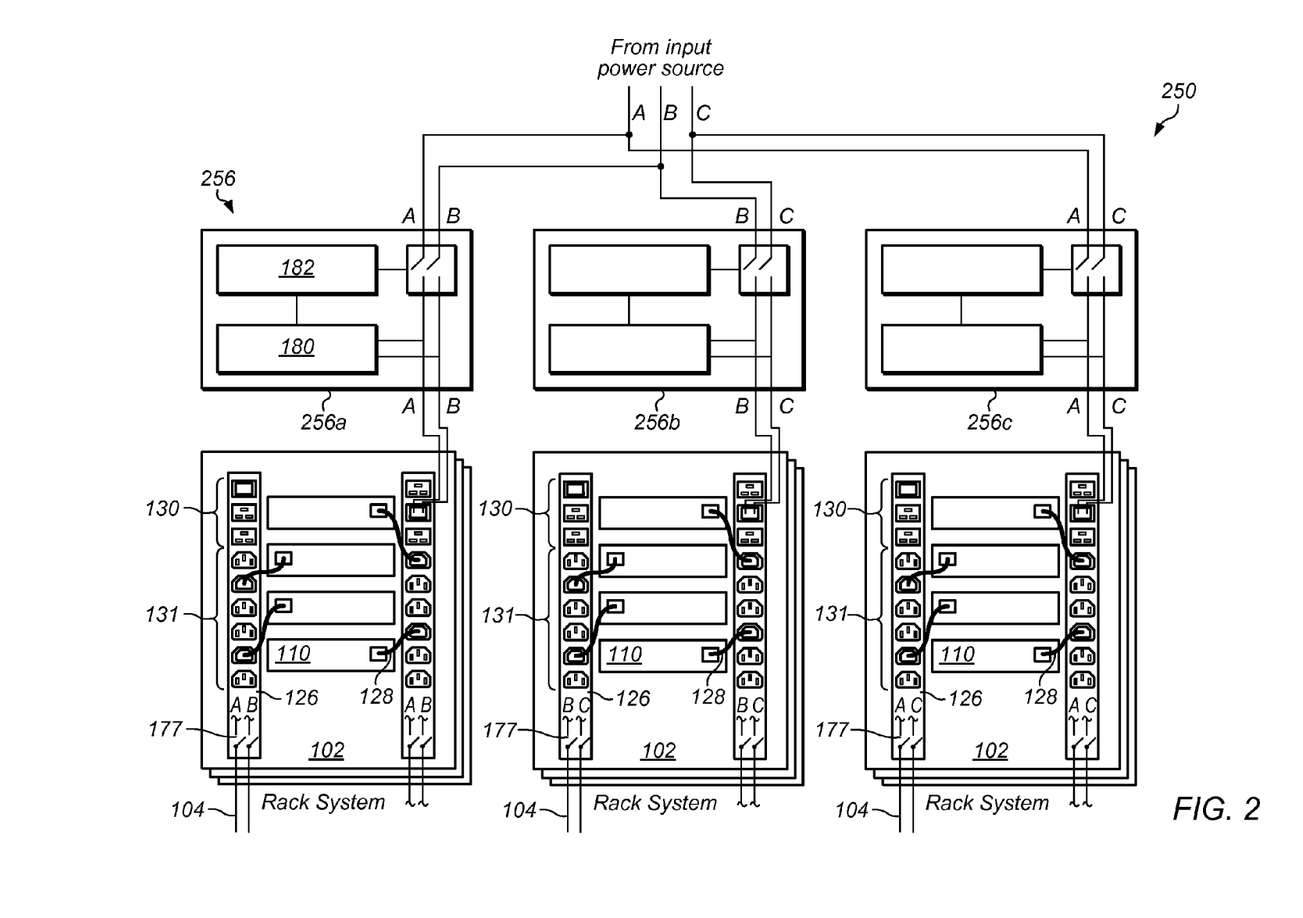
FIG. 2 illustrates a system that includes multiple feed devices that provide back-up power feeds to electrical systems.

In some embodiments, multiple feed devices provide back-up power feeds to electrical systems in a data center. FIG. 2 illustrates a system that includes multiple feed devices that provide back-up power feeds to electrical systems. System 250 includes rack systems 102, primary power system 254, and back-up feed system 256. Back-up feed system 256 includes back-up feed devices 258. Back-up feed devices 256 may receive electrical power from a power source. Back-up feed devices 256 may be similar to back-up feed device 108 described above relative to FIG. 1.

Each of back-up feed devices 256 may supply power supply power to rack PDUs 126 in a different phase combination. In this example, back-up feed device 256*a* supplies power in the phase combination AB, back-up feed device 256*b* supplies power to rack PDUs 126 in phase combination BC, and feed device 256*c* supplies back-up power to rack PDUs 126 in phase combination AC. Rack systems 256 include rack PDUs 126 and electrical systems 110.

In some embodiments, each of feed devices 256 supplies power to rack PDUs within a single rack. In other embodiments, some or all of feed devices 256 distribute power rack PDUs in multiple racks.

In some embodiments, a back-up feed system is coupled to many rack PDUs, each of which supplies power to many electrical systems. The electrical systems receive power from a primary power system. In certain embodiments, the back-up power device is oversubscribed such that the total power requirements of electrical systems coupled to the back-up feed device exceed the capacity of the back-up feed device. One or more of the sets of electrical systems can be automatically switched from primary power to back-up power (for example, upon tripping of a fault protection device in a rack PDU supplying power to the electrical systems), while primary power is maintained to other of the sets of electrical systems.

In various embodiments, back-up power is provided to many PDUs. In one embodiment, back-up power is implemented such that a system can support any N distribution system failures. In some embodiments, a back-up feed system is oversubscribed to achieve N+1 redundancy for a data center (rather than, for example, 2N power redundancy). In some embodiments, a back-up feed system having less than one-to-one redundancy may include overload protection, such as a breaker system, to protect against overload of the back-up feed system.

Figure 3:
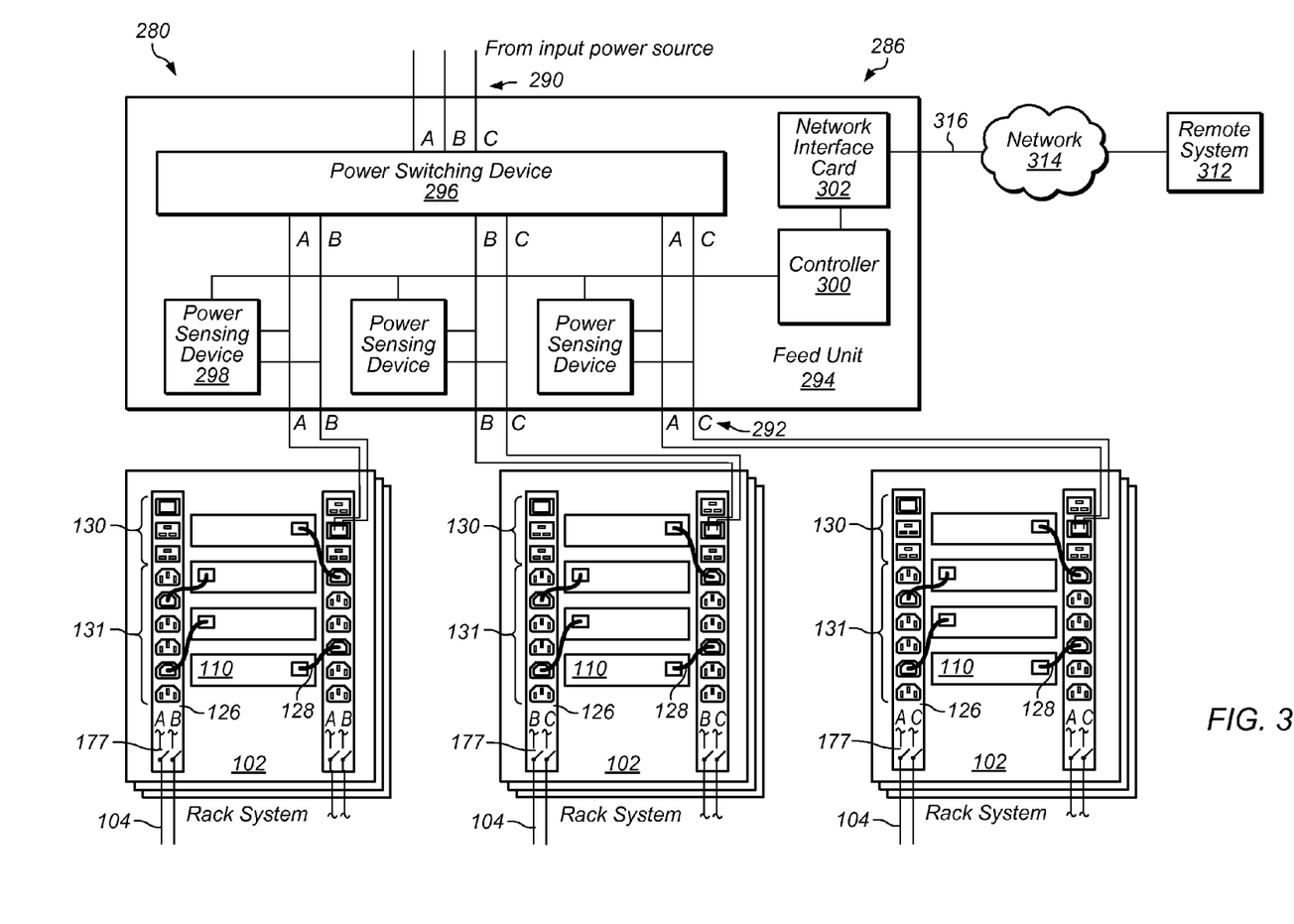
FIG. 3 is a schematic diagram illustrating one embodiment of a back-up feed device that supplies power feeds in multiple phases from a three-phase power source.

In some embodiments, a feed device can supply back-up power to PDUs in multiple phase combinations. In one embodiment, a back-up feed device synchronizes back-up feed power based on power sensed in a rack PDU. FIG. 3 is a schematic diagram illustrating one embodiment of a back-up feed device that supplies power feeds in multiple phases from a three-phase power source. System 280 includes rack systems 102, primary power system 102, and back-up feed device 286. Back-up feed system 286 may receive electrical power from a three-phase power source. Back-up feed system 286 may feed power to one or more of rack PDUs 126 in rack systems 102.

Back-up feed device 286 includes feed device input lines 290, feed lines 292, and feed unit 294. Feed unit 294 includes power switching device 296, power sensing devices 298, and controller 300.

Feed lines 292 may be coupled in PDU receptacles 130. Each of feed lines 292 may provide power in a different phase combination. Back-up feed device 286 may receive power from a power source. Back-up feed device 286 may supply back-up power to electrical systems 110 in rack systems 102 in the event of a fault condition in primary power system 104 (such as a loss of power to electrical systems 110).

For illustrative purposes, in the system illustrated in FIG. 3, input lines 290 receive three-phase power and feed lines 292 provide power in phase combinations AB, BC, and AC. In various embodiments, however, a feed device may provide power in any number of phase combinations. In some embodiments, a feed device receives input power that includes a neutral and supplies phase combinations that include a neutral (for example, AN, BN).

Power switching devices 296 and power sensing device 298 are coupled to controller 300. Power switching device 296 may receive power through feed device input lines 290. Controller 300 may control power switching device 298. Power switching device 296 may be operated to switch power to feed lines 292 on and off.

Power sensing device 296 may sense one or more characteristics or conditions of power in systems coupled to feed lines 292, such as rack PDUs 126. Examples of power characteristics and conditions that may be sensed by a power sensing device include power loss, power anomaly, phase, power redundancy, current levels, voltage levels, usage levels, and temperature.

In some embodiments, power from a power source that is to be switched on by a back-up feed system is synchronized with primary power in a rack PDU that is being backed-up. For example, if a rack PDU is supplying power in an AB phase combination of a three-phase power system, the back-up feed unit may be synchronized such that back-up power switched on by the back-up feed system is supplied in a matching AB phase combination.

Synchronization may include establishing a match between the pair of feed lines to a power distribution unit and a combination of input lines from a power source. Feed lines and input lines may be tested to determine a match between a pair of lines in the set of feed lines and a pair of lines in the set of input lines to match the phase of a pair of feed lines with the phase of the a pair of input lines. Matching may include determining characteristics including wave form, line voltage, frequency, phase sequence, and phase angle. In various embodiments, testing to establish synchronization may be performed automatically or semi-automatically, for example, by a processor in a synchronization system.

In some embodiments, a power switching device is used to synchronize a feed to match a phase combination of the primary power in a power distribution unit. For example, in the system illustrated in FIG. 3, controller 300 may perform a synchronization based on power characteristics sensed from feed device input lines 290 and a set of feed lines 292. Power characteristics on feed lines 292 may be sensed, for example, by one of power sensing devices 298. Based on the phase combination sensed in the feed lines, controller 300 may control power switching device to feed the matching phase combination.

During operation of electrical systems 110, power sensing devices 298 may sense power conditions in rack power distribution units 126 through feed lines 292. Controller 300 may use information from power sensing devices 298 to control power switching device 296. In one embodiment, controller 300 switches on a back-up feed to one of rack PDUs 126 upon detecting a fault condition in rack power distribution unit 126.

Back-up feed device 286 may include control circuits for monitoring and reporting on rack PDUs 126. In some embodiments, controller 300 includes a microprocessor that implements program instructions for monitoring and reporting on back-up feed device 286 and rack PDUs 126. In some embodiments, some or all of the components of the back-up feed device 286 are contained in an enclosure. The enclosure may be mounted inside the rack, on the rack, or at another location.

In some embodiments, back-up feed device 286 includes data storage elements. For example, back-up feed device 286 may include data storage elements for storing addresses for various ones of rack PDUs 126. In some embodiments, an address may be stored in association with a physical location within a data center (for example, Row 6, Rack 4, left-side rack PDU.)

Network interface card 302 may exchange data and signals between back-up feed device 286 and external system 312 over network 314 by way of network connection 316. In one embodiment, network interface card 302 is an Ethernet card. In another embodiment, network interface card 302 provides for a fiber optic transmission of data. In some embodiments, each of rack PDUs 126 is assigned an address, which is stored in memory in back-up feed device 286. If power is lost in one or more of the legs of a particular one of rack PDUs 126 (for example, one of overload protection devices 138 trips), back-up feed device 286 may sense that a fault has occurred in the rack PDU 126 and send a fault message to external system 312 over network 314. The message may include the appropriate address to identify the failed PDU.

In some embodiments, back-up feed device 286 receives control instructions from an external system, such as external system 312. In some embodiments, power switching among back-up feed device 286 and other power systems, such as a primary power system, reserve power system, uninterruptible power supply, or other power components is coordinated among back-up feed device 286 and other power components. For example, a back-up feed device 286 may be disabled from switching power to a rack power distribution unit if the rack power distribution unit is receiving power from a reserve power system (such as reserve power system 106 shown in FIG. 1).

In some embodiments, back-up feed device 286 reports to external system 312 status or other information relating to back-up feed device 286, rack power distribution units 126, electrical systems 110, and power distribution systems supplying power to electrical systems 110. Back-up feed device 286 may report, for example, whether back-up power is being fed to rack power distribution units, which power distribution units are receiving a feed, what phase combination is being fed, how long the feed as been on.

In some embodiments, messages are sent from a back-up feed device using Simple Network Management Protocol (SNMP) data (for example, an SNMP trap). Any network protocol, however, may be used in various embodiments to send data from, or receive data into, a back-up feed device.

In some embodiments, back-up feed device 286 may control an alarm on back-up feed device 286 or at the location of the rack PDUs. An alarm may be, for example, an audible alarm (such as a buzzer or siren) or a visual alarm (flashing light). Upon power loss or failure of a rack power distribution unit coupled to back-up feed device 286, back-up feed device 286 may trigger the alarm.

Figure 4:
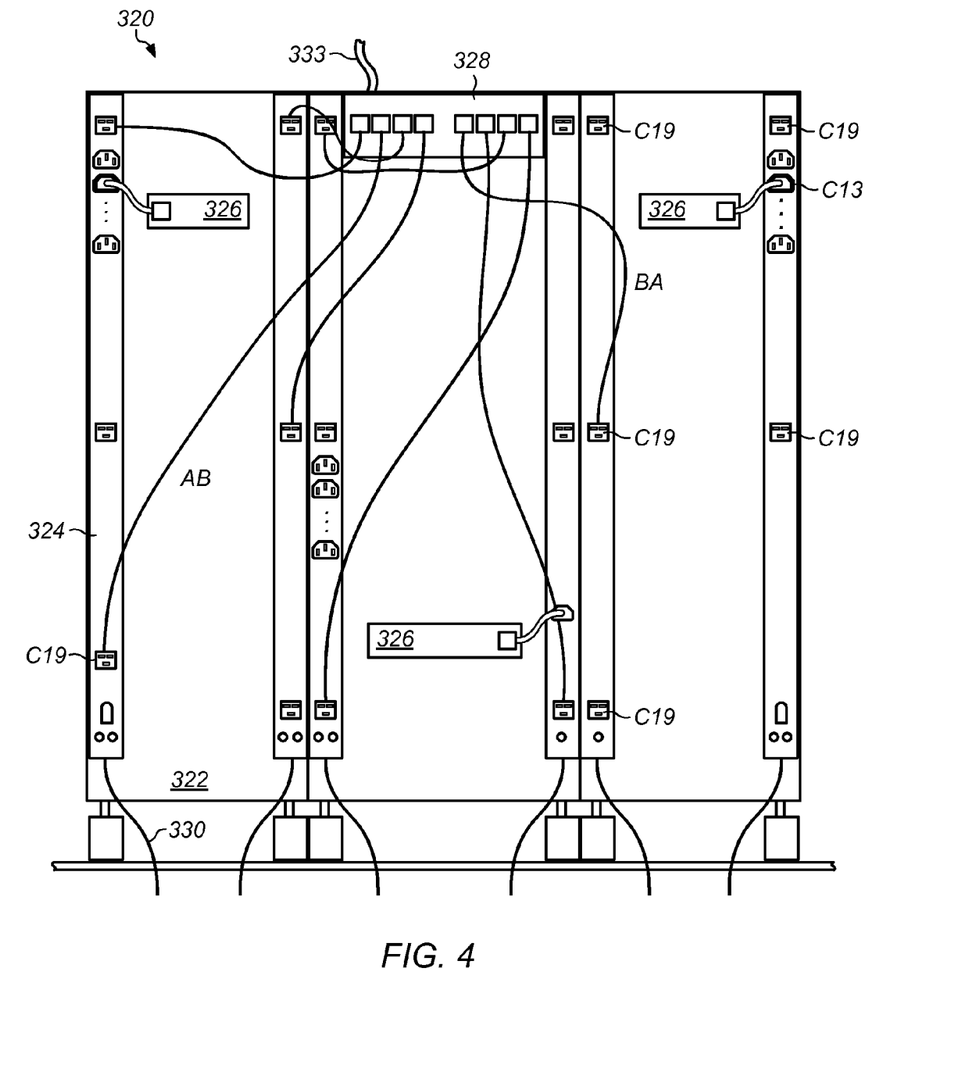
FIG. 4 illustrates one embodiment of a rack system including a feed device that can supply a back-up feed to rack power distribution units in the rack.

In some embodiments, a back-up feed device is rack-mountable. In some embodiments, a back-up feed device is installed in a rack containing rack power distribution units to which it is supplying a back-up feed. FIG. 4 illustrates one embodiment of a rack system including a feed device that can supply a back-up feed to rack power distribution units in the rack. System 320 includes racks 322, rack power distribution units 324, electrical systems 326, and back-up feed device 328. Rack power distribution units 324 receive primary power through input lines 330 supply power to electrical systems 328 by way of cables 332. Back-up feed device 328 receives a power input through input line 333. Back-up feed device 328 is coupled to rack power distribution units 324 by way of feed cables 334. Feed cables 334 may couple in rack PDU receptacles 336. In one embodiment, rack PDU receptacles 336 are IEC 60320 C19 receptacles.

In the embodiment shown in FIG. 4, back-up feed device 328 supplies power to rack power distribution unit feeds back-up power in two phase combinations (AB and BA). A back-up feed device 328 may, however, feed back-up power in any number of phase combinations.

Figure 5:
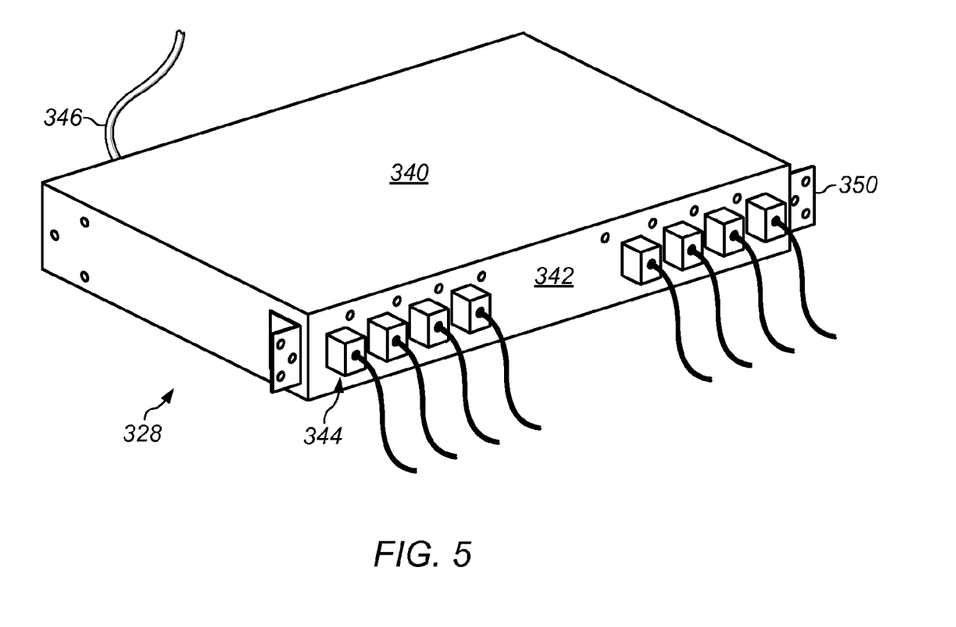
FIG. 5 illustrates one embodiment of a rack-mountable back-up feed device.

FIG. 5 illustrates one embodiment of a rack-mountable back-up feed device. Back-up feed device 328 includes enclosure 340, front panel 342, feed unit receptacles 344, and input cable 346. Enclosure 340 includes rack ears 350. Rack ears 350 may be used to install back-up feed device in a rack. In one embodiment, back-up feed device 328 mounts in a slot in a 19 inch standard rack.

In the embodiments shown in FIG. 4 and FIG. 5, the back-up feed device is rack-mountable. A back-up feed device may, however, be any shape and size. In certain embodiments, a back-up feed device has a "zero U" form factor that allows installation in a rack such that the system does not consume any of the slots in the rack. For example, a back-up feed device may mount on one side of a rack, such as next to a rack power distribution unit.

Although in the embodiment shown in FIG. 5, back-up feed device 328 includes eight feed unit receptacles 344. A feed unit may, however, in various embodiments include any number of receptacles. In certain embodiments, a feed unit includes only one receptacle.

In one embodiment, a back-up feed system includes 8 to 12 15-amp circuits feeding whips out to rack PDU receptacles (such as C19 receptacles). The rack power distribution may cover both associated circuits in the rack PDU. A separate back-up feed system may be provided for multiple racks (for example, 6 racks). The whips to the rack power distribute unit may sense current within the rack power distribution unit. Upon loss of power, point of power loss to a circuit in one of the rack power distribution units, the back-up feed system may switch power to the circuit. In one embodiment, each back up circuit can save up to 2 rack power distribution unit inputs at a time, allowing data technicians time, for example, to migrate a customer out and off the servers that are in danger due to loss of primary resiliency.

Figure 6:
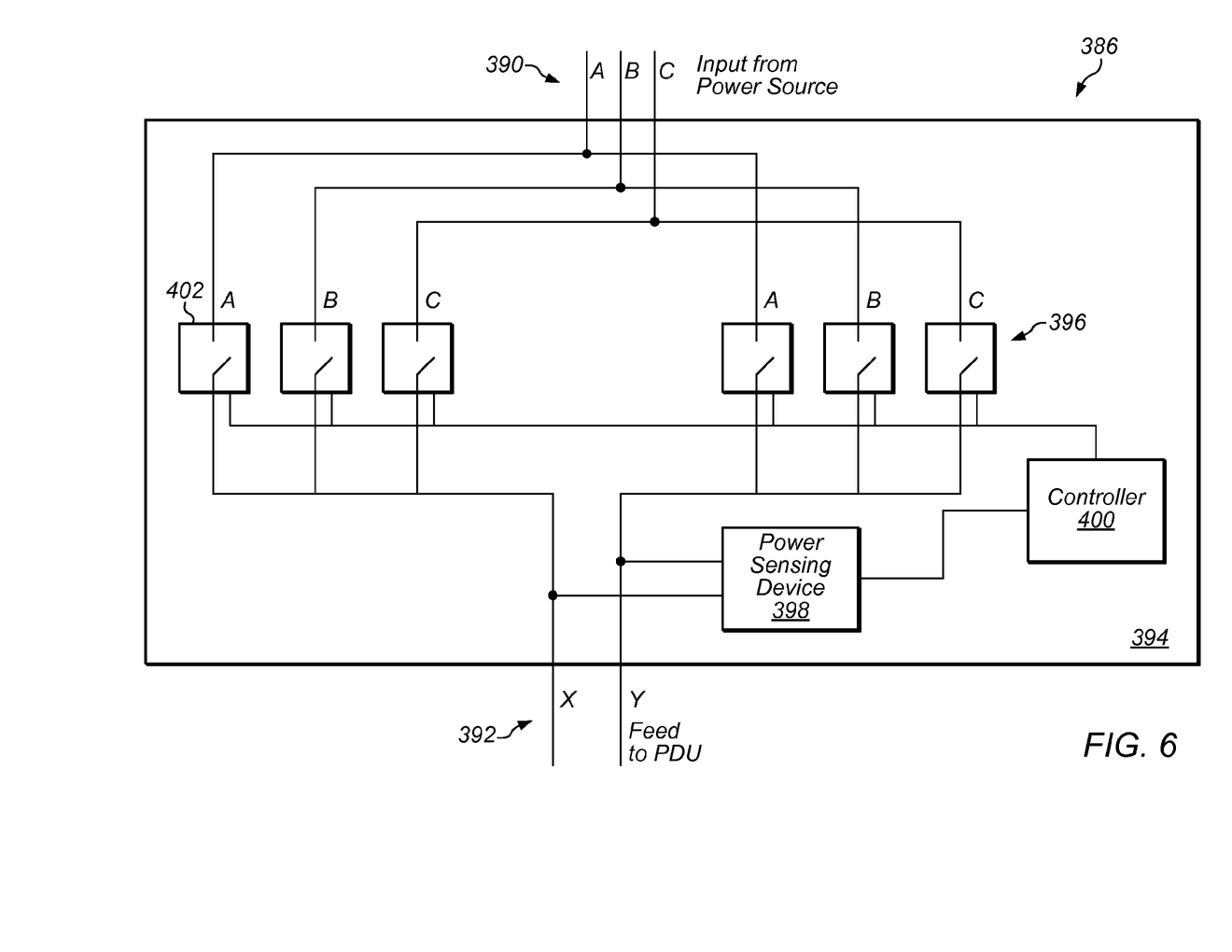
FIG. 6 is a schematic diagram illustrating one embodiment of a back-up feed device with a power switching system that can feed power to multiple rack systems in a selected phase combination.

FIG. 6 is a schematic diagram illustrating one embodiment of a back-up feed device with a power switching system that can feed power to multiple rack systems in a selected phase combination. Back-up feed device 386 includes feed device input lines 390, feed lines 392, and feed unit 394. Feed unit 394 includes power switching device 396, power sensing devices 398, and controller 400.

Feed lines 392 may be coupled in PDU receptacles 130. Back-up feed device 396 may receive power from a power source. Back-up feed device 396 may supply back-up power to electrical systems 110 in rack systems 102 in the event of a fault condition in primary power system 104 (such as a loss of power to electrical systems 110).

For illustrative purposes, in the system illustrated in FIG. 6, input lines 390 receive three-phase power and feed lines 392 provide power in one of phase combinations AB, BC, and AC. In various embodiments, however, a feed device may provide power in any number of phase combinations. In some embodiments, a feed device receives input power that includes a neutral and supplies phase combinations that include a neutral (for example, AN, BN).

Power switching devices 396 and power sensing device 398 are coupled to controller 400. Power switching device 396 may receive power through feed device input lines 390. Controller 400 may control power switching device 398. Power switching device 396 may be operated to switch power to feed lines 392 on and off.

Power switching device 396 includes relays 402. Each of relays 402 may be opened and closed. In one embodiment, each of relays 402 can be independently opened and closed by controller 400. Controller 400 may be operated to open and close combinations of relays 400 to control a feed from input lines 390 to feed lines 392. Control of the feed may include controlling a phase combination. For example, controller 400 may close relays to produce an AB feed, a BA feed, a BC feed, or other combination.

In some embodiments, during operation of electrical systems 110, power sensing device 396 senses one or more characteristics of power rack PDU 126. Power sensing device 396 may sense characteristics of feed lines 392 to determine the phase of feed lines 392. Controller 400 may receive information from power sensing device 396.

In one embodiment, controller 400 implements instructions to switch relays 402 in power switching device 398 based on phase information from power sensing device 396. In one embodiment, a back-up feed system implements relay switching based on the following:

The system may recognize four relay logic values as follows:

| Value | Condition |
|-------|-----------|
| 2 | relays ready for load |
| 1 | relay preload state |

-continued

| Value | Condition |
|---|---|
| 0 | relay preload state |
| −1 | relay lock out |

All relays include a default setting of 0

| Phase | X | Y |
|---|---|---|
| A | AX | AY |
| B | BX | BY |
| C | CX | CY |

The basic logic may be implemented as follows:
If AX=208 and BX=208, then CX=1
If AX=208 OR BX=208 then CX=−1
If CX=1 Set AX=−1 and BX=−1
If voltage CX<5v then CX=2

The system may progress through all of combinations, when there are a total of two relays with a value of 2 and four relays with a value of −1. The system may close the two corresponding relays, establishing the feed through feed lines 392 in the phase combination that matches the power in the power distribution unit.

In some embodiments, back-up feed device 386 performs a test to determine the phase combination to be fed based on information sensed from a power distribution unit. The values for the relays may be computed and stored. With the values stored, back-up feed device 386 may monitor the power distribution unit for a fault condition. When a fault condition occurs, back-up feed device 386 may retrieve the stored values to close the appropriate relays to establish a back-up feed to the power distribution unit.

Figure 7:
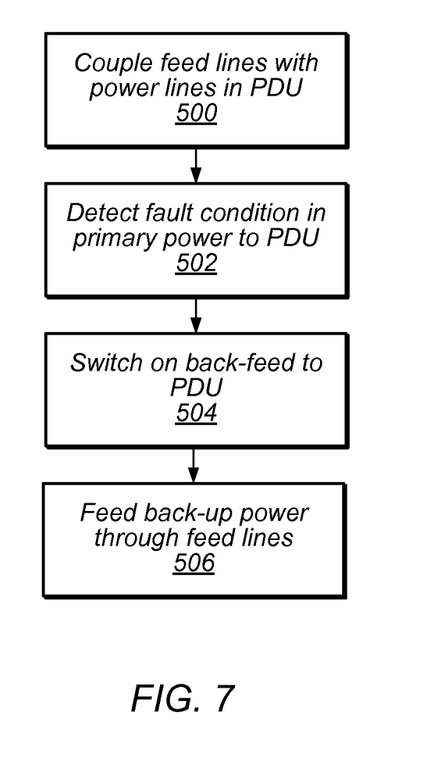
FIG. 7 illustrates maintaining electrical power to electrical systems in operation using a back-up feed.

In one embodiment, maintaining electrical power to electrical systems in operation includes feeding back-up power into a power distribution unit downstream from circuit protection devices in the power distribution unit. FIG. 7 illustrates maintaining electrical power to electrical systems in operation using a back-up feed. At 500, feed lines are coupled with one or more power lines in a power distribution unit. The feed lines may be coupled to at least one of the power lines at a location downstream from a circuit protection device in the power distribution unit. In some embodiments, the feed lines are back-fed into the power distribution unit by coupling the feed lines in output receptacles in the power distribution unit.

In some embodiments, power to be supplied from a back-feed system may be synchronized with power being supplied in the rack power distribution unit. For example, the system may detect that the rack power distribution is supplying power in an AB phase combination. In response, the back feed system may be set to supply back-up power in an AB phase combination.

At 502, a fault condition in the primary power distribution system. The fault condition may be, for example, a tripped breaker caused by a short in an electrical system coupled to the power distribution unit. In some embodiments, the device that is to provide the feed senses characteristics or conditions of power in the power distribution unit through one or more feed lines to the at least one power distribution unit At 504, a back-up feed is switched on in response to the fault condition. In some embodiments, the system may implement checks before a back-up feed is switched on. For example, a check may be made to determine whether a short condition is still present in any of the electrical systems receiving power from the power distribution unit.

At 506, back-up power is supplied through the feed lines to at least one of the electrical systems. The back-up feed may be continued until corrective action is taken. Corrective action may include, for example, service personnel removing defective equipment, or resetting a circuit protection device in the power distribution unit.

In certain embodiments, a power source for a back-up feed system includes a reserve power system. In this case, the power source may include a main power system that provides power the back-up feed system under normal conditions, and also a reserve power system that provides power in the event of a failure of the main power system. In one embodiment, reserve power to a back-up feed is implemented by way of an automatic transfer switch. The automatic transfer switch may switch to reserve power in the event of a power loss to the main power system supplying power to the back-up feed system. The automatic transfer switch may be implemented in a manner similar to ATS 120 shown in FIG. 1. In one embodiment, the automatic transfer switch for a back-up feed system switches power between two UPSs.

Although in the examples described above, the secondary feed or backfeed was established by feeding into a power distribution unit, in certain embodiments, a secondary or tertiary feed may be established by feeding into other elements in a power distribution system. In certain embodiments, a secondary feed is established by backfeeding into a remote power panel.

Although in the examples described above, a secondary feed is made into a rack-level PDU, a secondary power feed may in various embodiments be supplied to any component in a system. In one embodiment, a backfeed is established into output receptacles of a floor PDU. The power source may come from any source, such as different floor PDU, a UPS, or other system. A floor PDU back feed may be established, for example, to replace a circuit breaker in the floor PDU.

In some embodiments, meters may be used to test electrical power characteristics of a feed input. In certain embodiments, one or more meters are integrated into an enclosure for a backfeed device. In other embodiments, one or more meters are provided as a stand alone measurement device, such as a stand-alone oscilloscope.

In certain embodiments, the power source for a secondary feed may be a PDU other than the primary floor PDU for the circuit in the rack. In such embodiments, a maximum variation may be established for the potential. In one embodiment, the potentials allowed to differ by no more than of 7 VAC. In another embodiment, the potential is allowed to differ by no more than 5%. In some embodiments, phase integrity may be verified by two electricians.

In various embodiments described above, a feed system is wired to provide any combination of phases from a three-phase power source. A feed system may, however, provide other types of power (for example, two-phase, single phase). In one embodiment, a secondary feed system receives two-phase power from a power source and allows synchronization for any combination of phases of the two-phase power. In one embodiment, a secondary feed system receives single-phase power (for example, one hot and one neutral) from a power source and allows synchronization with any phase and neutral of a poly-phase system.

Although in some embodiments described herein, an additional feed is a secondary feed connected in parallel to a single primary feed, power feeds may, in various embodiments, be added to systems having any number of existing feeds. Thus, an additional power feed may be a secondary power feed, a tertiary power feed (for example, a feed to a system receiving power from two existing power systems), etc.

In some embodiments described herein, a feed is provided through a connection to sub-floor systems in a power distribution system. Power feeds, however, be coupled to power components in any location. In some embodiments, primary power distribution system, reserve power system, or backup feed system components are provided on the ceiling of a computing room (for example, power cables suspended from the ceiling or in trays in the computing room).

For illustrative purposes, cables and devices have been described herein as having one or more "inputs" and "outputs". Such inputs and outputs may include various contacts or conductors ends for conductors in the cable or device. Cables and devices having inputs and outputs may be passive (for example, a cable having wires that transmit power from one end of the cable to the other end). In some embodiments, input and output ends of a cable are reversible. For example, both ends of a cable may include an L6-30P plug.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power distribution system, comprising:
   one or more rack power distribution units configured to supply electrical power to one or more electrical systems through one or more power lines;
   a primary power system configured to supply electrical power to at least one of the power lines in at least one of the one or more rack power distribution units; and
   one or more back-up feed systems, wherein at least one of the one or more back-up feed systems comprises:
   a feed input coupled with an electrical power source;
   a feed output coupled with the at least one of the one or more power lines in the at least one of the one or more rack power distribution units at a location downstream from at least one circuit protection device in the at least one of the one or more rack power distribution units; and
   a feed switching device configured to supply back-up electrical power from the power source to at least one of the one or more electrical systems during a loss of electrical power from the primary power system via the feed output.

2. The power distribution system of claim 1, wherein the feed output of the at least one back-up feed system comprises one or more cables comprising one or more feed lines, wherein at least one of the cables is configured to couple in a rack PDU output receptacle in the at least one rack power distribution unit, wherein the feed lines are configured to supply power to the electrical systems through the rack PDU output receptacle.

3. The power distribution system of claim 1, wherein the at least one back-up feed system further comprises a power sensing device configured to sense power characteristics in the at least one rack power distribution unit.

4. The power distribution system of claim 1, wherein the at least one back-up feed system is configured to control the feed switching device to switch on back-up power to the at least one rack power distribution unit in response to a fault condition in the power being supplied to electrical systems through the at least one rack power distribution unit.

5. The power distribution system of claim 1, wherein the at least one back-up feed system is configured to supply back-up power to two or more lines in the at least one rack power distribution unit.

6. The power distribution system of claim 1, wherein the at least one back-up feed system is configured to supply back-up power in two or more phase combinations.

7. The power distribution system of claim 6, wherein the at least one back-up feed system is configured to switch phase combinations to the feed output among two or more different phase combinations.

8. The power distribution system of claim 1, wherein the one or more rack PDUs comprises two or more rack PDUs, wherein one of the one or more back-up feed systems is configured to supply back-up power to two or more power lines in at least two of the two or more rack power distribution units.

9. The power distribution system of claim 1, wherein the at least one back-up feed system is coupled to two or more power lines in at least one of one or more rack power distribution units, wherein the at least one back-up feed system is oversubscribed such that the back-up feed system is configured to supply power to only some of the power lines at any given time.

10. The power distribution system of claim 1, wherein the at least one back-up feed system comprises two or more back-up feed systems, wherein each of at least two of the back-up feed systems is configured to supply back-up power in a phase combination different from at least one of the other back-up feed systems.

11. A back-up feed system, comprising:
    a feed input configured to couple with, and receive power from, an electrical power source; and
    a feed output configured to couple with one or more power lines in one or more power distribution units at a location downstream from at least one circuit protection device in at least one of the one or more power distribution units; and
    a feed switching device configured to supply, via the feed output, back-up electrical power from the power source when a fault condition exists in the power distribution unit.

12. The back-up feed system of claim 11, wherein the feed output comprises one or more cables comprising one or more feed lines, wherein at least one of the one or more cables is configured to couple in a PDU output receptacle in at least one of the one or more power distribution units, wherein the feed lines are configured to supply power to the electrical systems through the PDU output receptacle.

13. The back-up feed system of claim 11, further comprises a power sensing device configured to sense power characteristics in the at least one power distribution unit.

14. The back-up feed system of claim 13, wherein the feed output comprises one or more feed lines configured to couple with power lines in at least one of the one or more power distribution units,
    wherein the back-up feed system further comprising one or more power sensing devices, wherein at least one of the power sensing devices is configured to sense, over at least one of the feed lines, one or more characteristics or conditions of power in the at least one power distribution unit.

15. The back-up feed system of claim 13, wherein the feed output comprises one or more feed lines configured to couple with power lines in at least one of the one or more power distribution units and one or more sensor lines configured to carry a signal from at least one of the power lines of the at least one power distribution unit to the power sensing device,
    wherein the back-up feed system further comprising one or more power sensing devices, wherein at least one of the power sensing devices is configured to sense, over at least one of the sensor lines, one or more characteristics or conditions of power in the at least one power distribution unit.

16. The back-up feed system of claim 11, wherein at least one of the one or more power sensing devices is in the at least one power distribution unit.

17. The back-up feed system of claim 11, wherein the back-up feed system is configured to supply back-up power in two or more phase combinations.

18. The back-up feed system of claim 11, wherein the back-up feed systems is configurable to supply back-up power to two or more power lines in the at least one power distribution unit.

19. The back-up feed system of claim 11, wherein the back-up feed system is configured to selectively supply power in two or more different phase combinations to two or more different power lines in at least one of the one or more one or more power distribution units.

20. The back-up feed system of claim 11, wherein the back-up feed system is configured to control the feed switching device to switch on back-up power to the at least one rack power distribution unit in response to a fault condition in the power being supplied to electrical systems through the at least one rack power distribution unit.

21. The back-up feed system of claim 20, wherein the back-up feed system is configured to switch on back-up power to the at least one power distribution unit in response to sensing a fault condition in the at least one power distribution unit.

22. The back-up feed system of claim 20, wherein the back-up feed system is configured to switch on back-up power to the at least one power distribution unit in response to receiving a message from an external device.

23. The back-up feed system of claim 20, wherein the back-up feed system is configured to switch on back-up power to the at least one power distribution unit in response to at least one circuit protection device tripping in the at least one power distribution unit.

24. The back-up feed system of claim 11, further comprising a controller configured to control the feed switching device to switch a back-up feed to the at least one power distribution unit on or off.

25. The back-up feed system of claim 11, wherein the feed switching device comprises one or more relays, wherein at least one of the relays is operable to open or close to switch a feed to the at least one power distribution unit on or off.

26. A method of maintaining electrical power to electrical systems in operation, comprising:
    coupling one or more feed lines with one or more power lines in one or more power distribution units, wherein at least one of the feed lines is coupled to at least one of the power lines at a location downstream from a circuit protection device in at least one of the one or more power distribution units, wherein the at least one power distribution unit is included in a primary power distribution system that supplies power to one or more electrical systems;
    detecting a fault condition in the primary power distribution system;
    switching on a back-up feed in response to the fault condition; and
    supplying back-up power from the back-up feed through the feed lines to at least one of the electrical systems.

27. The method of claim 26, wherein detecting a fault condition in the primary power distribution system comprises sensing one or more characteristics or conditions of power in the at least one power distribution unit through one or more feed lines to the at least one power distribution unit.

28. The method of claim 26, wherein detecting a fault condition in the primary power distribution system comprises detecting a loss of power to at least one circuit in the at least one power distribution unit.

29. The method of claim 26, further comprising:
    detecting a phase combination of two or more output lines in the at least one power distribution unit; and
    supplying power through the back-up feed to at least one of the electrical systems, wherein the power is supplied in the detected phase combination.

30. The method of claim 29, wherein detecting the phase combination comprises detecting one or more power characteristics on one or more of the feed lines to the at least one power distribution unit.

31. The method of claim 29, wherein detecting the phase combination comprises supplying power through the back-up feed to at least one of the electrical systems comprising synchronizing a feed from a power source with power in the at least one power distribution unit.

32. The method of claim 26, wherein coupling one or more feed lines with one or more power lines in one or more power distribution units comprises oversubscribing a feed system such that the feed system has the capacity to provide back-up power to only some of the electrical systems coupled to the one or more power lines of the one or more power distribution units.

* * * * *